United States Patent
Mayer et al.

[11] Patent Number: 5,865,267
[45] Date of Patent: Feb. 2, 1999

[54] DIRECT DRIVE POWER ASSIST APPARATUS FOR A BICYCLE

[75] Inventors: Richard A. Mayer, Saugus; Bruce S. Widmann, Simi Valley, both of Calif.

[73] Assignee: Electric Bicycle Company, Burbank, Calif.

[21] Appl. No.: 698,679

[22] Filed: Aug. 16, 1996

[51] Int. Cl.⁶ .................................................. B62M 23/02
[52] U.S. Cl. ........................................ 180/205; 180/220
[58] Field of Search .................................... 180/205, 206, 180/207, 220, 65.5, 907, 68.5, 221, 225

[56] References Cited

U.S. PATENT DOCUMENTS

| 0,675,390 | 6/1901 | Keating .................................. | 180/68.5 |
|---|---|---|---|
| 1,743,751 | 1/1930 | Baker ..................................... | 180/65.5 |
| 3,387,681 | 6/1968 | Rabjohn ................................. | 180/65.5 |
| 3,921,741 | 11/1975 | Garfinkle et al. ........................ | 180/34 |
| 4,410,060 | 10/1983 | Cunard .................................... | 180/220 |
| 5,253,724 | 10/1993 | Prior ........................................ | 180/907 |
| 5,341,892 | 8/1994 | Hirose et al. ........................... | 180/220 |
| 5,368,122 | 11/1994 | Chou ....................................... | 180/220 |
| 5,375,676 | 12/1994 | Takata et al. ........................... | 180/206 |
| 5,474,150 | 12/1995 | Mabuchi ................................. | 180/220 |
| 5,487,442 | 1/1996 | Hua ........................................ | 180/220 |
| 5,671,821 | 9/1997 | McGreen ................................ | 180/220 |

FOREIGN PATENT DOCUMENTS

| 2124274 | 11/1972 | Germany ............................... | 180/68.5 |
|---|---|---|---|
| 93011992 | 6/1993 | WIPO ..................................... | 180/220 |

*Primary Examiner*—Anne Marie Boehler
*Attorney, Agent, or Firm*—Jack C. Munro

[57] ABSTRACT

A power assist apparatus, which includes a battery powered motor mounted on a manually operated vehicle, such as a bicycle, and is to be selectively usable by the rider of the bicycle to not only assist in the manual operation of the bicycle, but also conceivably as a sole source of operation of the bicycle. The power assist apparatus is fixedly mounted on the bicycle and is carried with the bicycle at all times. The power assist apparatus includes a motor assembly which is operated through a gear connection to drive a driven gear mounted in conjunction with a wheel of the bicycle. The rotational axis of the shaft of the motor is parallel to the rotational axis of the wheel.

7 Claims, 4 Drawing Sheets

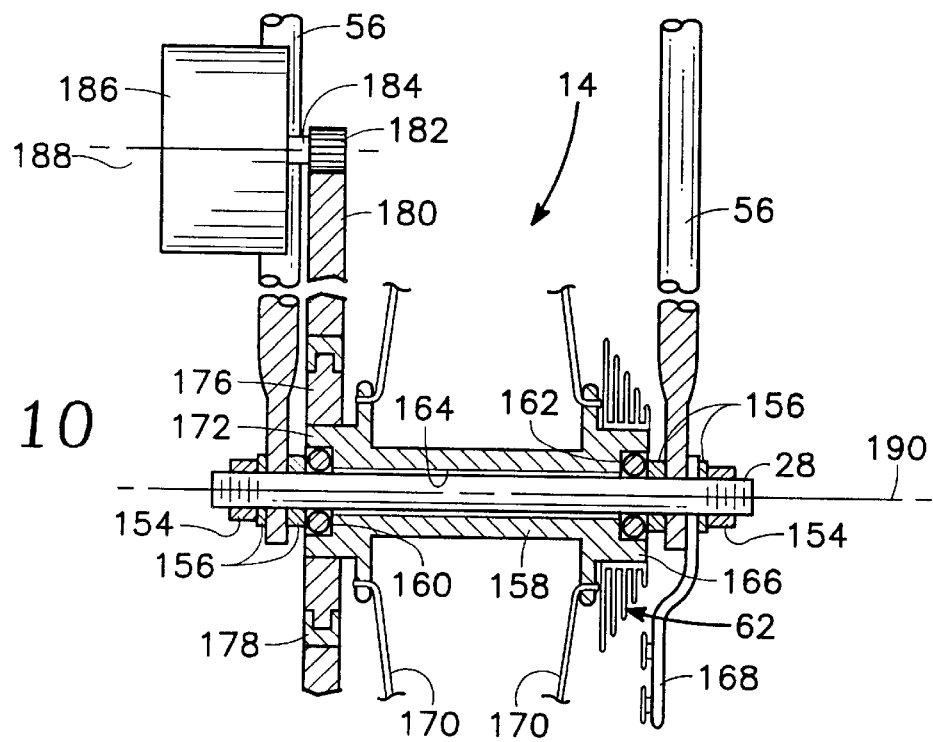

DIRECT DRIVE POWER ASSIST APPARATUS FOR A BICYCLE

BACKGROUND OF THE INVENTION

1) Field of the Invention

This invention relates to a battery powered assist apparatus for a manually operated vehicle such as a bicycle, and more particularly to a new and novel construction of a powered assist apparatus for that bicycle.

2) Description of the Prior Art

The subject matter of this invention has been found to be particularly useful in conjunction with bicycles. However, it is within the scope of this invention that it could be used in conjunction with other manually operated vehicles such as tricycles, scooters and the like.

Electric powered bicycles are well known. Electric powered bicycles generally incorporate an electric motor powered by a rechargeable battery. The electric motor is connected to a drive wheel which frictionally engages with a wheel of the bicycle. Operation of the drive wheel supplies power which supplements the manual movement of the bicycle. These prior art types of power assist devices for bicycles have offered solutions toward significant powering of a bicycle with the motor by permitting usage of the bicycle in a normal manner. These prior art solutions have, however, been mechanically and or cosmetically complex. The past designs have been inclined toward adding mechanical hardware rather than toward the utilization of existing bicycle hardware Extra gears, gear boxes, chains and sprockets are often featured conspicuously on such designs. Also, motor accessories such as throttles, belts and shields are also commonly featured. Additionally, the complexity of the prior art devices has inherently substantially increased the cost of such devices.

Air pollution has become an increasing undesirable problem due, in part, to the increase in use of automobiles and motorcycles. Air pollution is particularly acute in cities. It has been known that one way to improve air quality is to decrease the usage of automobiles and motorcycles. People use automobiles and motorcycles not only for longer trips but for short term travel close to home such as "running to the store." One way to decrease air pollution is to use a bicycle for making these short trips in close proximity to one's home. However, frequently these short trips require that the operator of the bicycle pedal the bicycle up one or more hills. This generally deters most people from using a bicycle when making such trips. However, if a power assist device was incorporated in conjunction with the bicycle, then possibly a user may be more apt to use a bicycle when making such trips since the overall effort to be expended by the operator would be decreased.

In the past, designing a practical, economical electric propulsion system for a bicycle has proven to be a formidable task. This task is evidenced by the absence of electric powered bicycles in commercial production at this time. An electrically operated bicycle, which effectively competes against other forms of transportation, remains lacking.

The prior art direct drive power assist for a bicycle has invariably required a right angle gearing arrangement utilizing bevel gears. Such gearing arrangements are complex as well as noisy. The fact that the axis of the motor is located at a right angle to the wheel axis of the bicycle inherently produces a complex and more expensive driving arrangement for the bicycle. Also, the prior art power assist apparatuses have made it difficult to remove and replace the wheel of the bicycle for tire repair and/or replacement.

SUMMARY OF THE INVENTION

The subject invention is a power assist apparatus for a bicycle which utilizes a direct drive arrangement between an electric motor and a driven gear mounted on the hub of one of the wheels of the bicycle. It has been found to be most desirable to have the axis of the rotatable shaft of the motor parallel to the rotational axis of a wheel for reasons of simplicity and smoothness of operation. A one-way clutching mechanism is to be mounted between the wheel and the motor. A series of batteries are to be used to power the motor and can be mounted within the frame of the bicycle. There may be utilized two driving motors (mounted in parallel) which additively combine the power output of the motors in conjunction with a single driven gear or where each motor connects to a separate driven gear. Each motor may actually comprise a plurality of separate motors which are connected in a ganged relationship. The output of these separate motors is conducted to the driven gear directly through a drive gear or through a drive belt arrangement. In some installations, only one motor and gearing system may be used on one side of the wheel of the bicycle.

The primary objective of the present invention is to provide a vehicle of transportation for work and recreation that can be used by most people without adding to the smog caused by combustion engines, especially in urban areas.

A further objective of the present invention is to construct a power assist apparatus for a bicycle which is composed of few parts, is of lightweight construction, is extremely efficient, durable in operation and requires a minimum of maintenance and yet still can be economically manufactured.

Another objective of the present invention is to construct a smooth operating, substantially vibration-free direct drive power assist apparatus for a bicycle.

Another objective of the present invention is to construct a power assist apparatus for a bicycle which does not interfere with the maneuverability of the wheel on which it is mounted permitting normal tire repair and replacement.

BRIEF DESCRIPTION OF THE DRAWINGS

FIG. 10 is a view similar to FIG. 3 but with a single motor mounted on the rear wheel of the bicycle; and FIG. 11 is a cross-sectional view of a modified form of axle where the axle includes a series of shifting gears.

DETAILED DESCRIPTION OF THE ILLUSTRATED EMBODIMENTS

Figure 1:
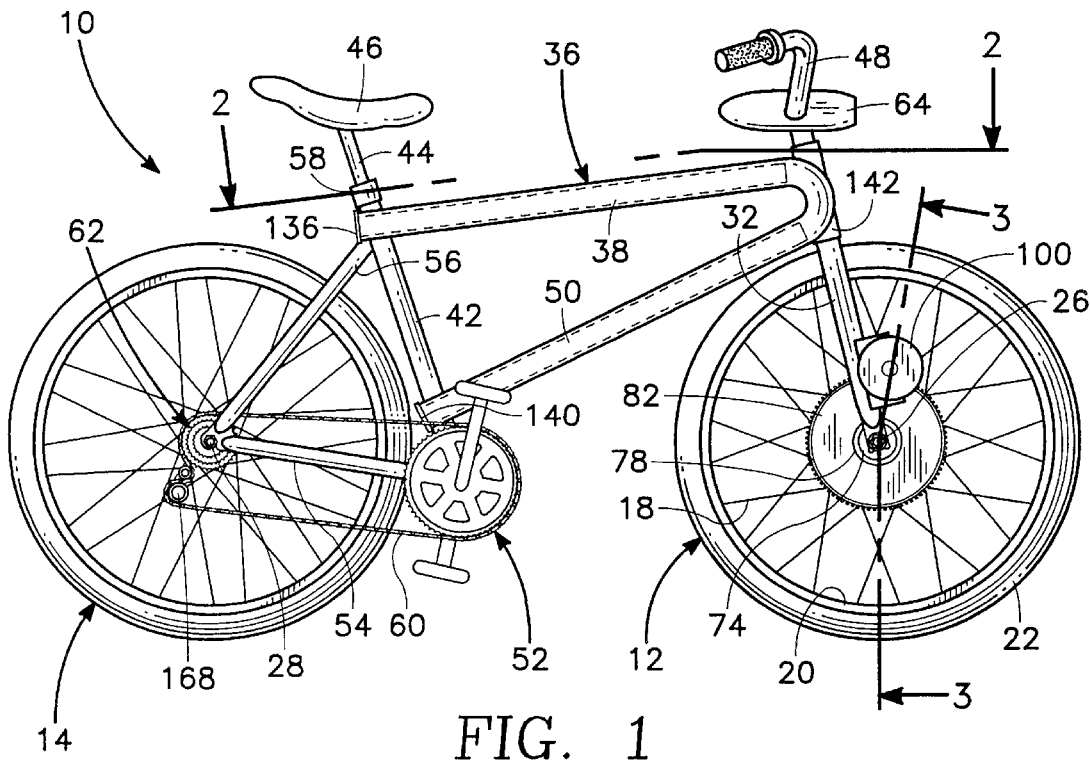
FIG. 1 is a side elevational view of a bicycle upon which has been mounted the power assist apparatus of the present invention.
Figure 2:
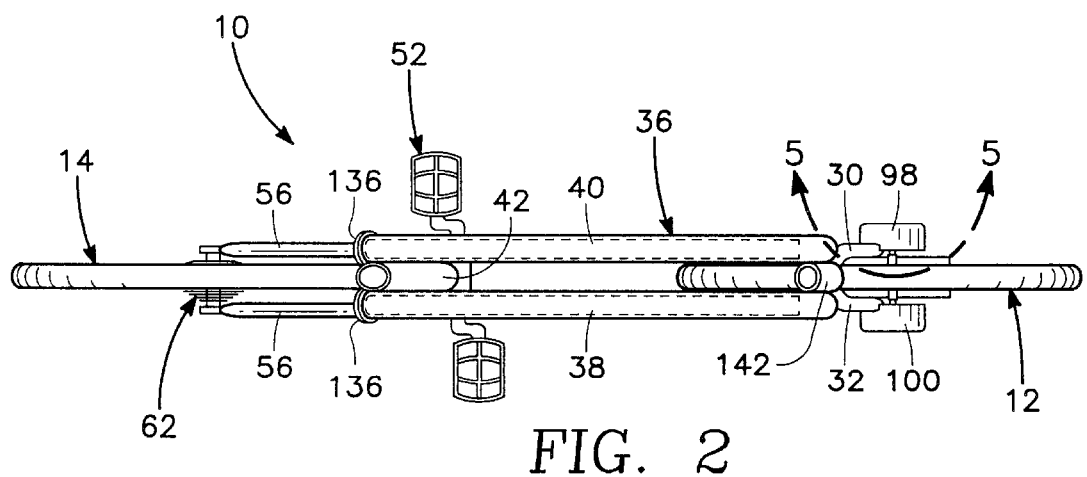
FIG. 2 is a top plan view of a bicycle, partly in cross-section, taken along line 2—2 of FIG. 1.

This invention is described in relation to a bicycle. However, it is to be understood that this invention could be used on a bicycle type vehicle that has three or four wheels. The word bicycle will be understood to include all such vehicles.

The subject matter of this invention shows and describes two motors (98 and 100) connected in parallel mounted on the front wheel 12 of the bicycle 10. However, the preferred embodiment will probably be a single motor mounted on the rear wheel 14 of the bicycle 10 as shown in FIG. 10. The single motor will be mounted on one side of the rear wheel 14 with the derailleur 62 of the bicycle mounted on the opposite side of the rear wheel 14.

Referring particularly to the drawings, there is shown in FIG. 1 a bicycle 10 having a front wheel 12 and a rear wheel 14. The front wheel 12 includes an axle sleeve 16 from which extends a plurality of wire spokes 18. The wire spokes 18 are affixed to a tire rim 20 on which is mounted a rubber tire 22. It is to be understood that the rear wheel 14 is constructed in a similar manner.

The axle sleeve 16 includes a longitudinal through opening 24. Conducted through the through opening 24 is a front wheel axle 26. The rear wheel 14 similarly includes a rear wheel axle 28. The front wheel axle 26 is fixedly mounted onto a pair of spaced apart front fork members 30 and 32. The fixing of the front wheel axle 26 to the front fork members 30 and 32 is by means of conventional nuts 34 which are threadably secured to the threaded ends of the front wheel axle 26 and which bind against the front fork members 30 and 32 with washers 33 mounted on each side of the fork members 30 and 32.

The front fork members 30 and 32 are part of the bicycle frame 36. The bicycle frame 36 includes a crossbar which is formed of a pair of crossbar members 38 and 40 which are located in a side-by-side relationship. These crossbar members 38 and 40 extend from the front fork members 30 and 32 to a seat tube 42. Mounted on the upper end of the seat tube 42 is a seat post 44 with a seat 46 being mounted on the seat post 44. Handlebar 48 is mounted on the upper end of the front fork members 30 and 32. The handlebar 48 is fixedly mounted within head tube 142 which is in turn fixedly mounted between the crossbar members 38 and 40. The lower end of the seat tube 42 connects to down tubes 50. There will normally be two in number of the down tubes 50 with a down tube 50 being integral with crossbar member 38 and the remaining down tube 50 being integral with crossbar member 40.

The lower end of the seat tube 42 is fixedly secured to a pedal assembly 52. From the pedal assembly 52 there is mounted a chain stay 54 with the chain stay 54 being mounted on the rear axle 28. From the rear axle 28 and the chain stay 54 there is located a seat stay 56. The seat stay 56 is welded or otherwise fixedly secured to the seat tube 42 directly adjacent the connection to the crossbar member 38. Directly adjacent this point of connection with the crossbar member 38 there is mounted a collar 58 on the seat tube 42.

The collar 58 is to provide the connection with the seat post 44. The manual motive force through the pedal assembly 52 is transferred by a chain 60 through a series of gears 62 that are mounted in conjunction with the rear wheel 14 and located about the rear wheel axle 28. The electronic control unit 64 is mounted on the handlebar 48.

The axle sleeve 16 is rotatably mounted by means of bearings 66 and 68 on the front wheel axle 26. The axle sleeve 16 includes a right portion 70 that is located on the right side of the front wheel 12 and a left portion 72 that is located on the left side of the front wheel 12. The portions 70 and 72 are rotatable relative to the front wheel axle 26. Fixedly mounted onto the right portion 70 is a disc 74 with a similar disc 76 being fixedly mounted on the left portion 72. Mounted on the periphery of the disc 74 is a one-way clutch mechanism 78 with a similar such clutch mechanism 80 being mounted about the periphery of the disc 76. Mounted on the clutch mechanism 78 is an external gear 82 with a similar external gear 84 being mounted on the clutch 80. External gears 82 and 84 comprise driven gears.

Figure 3:
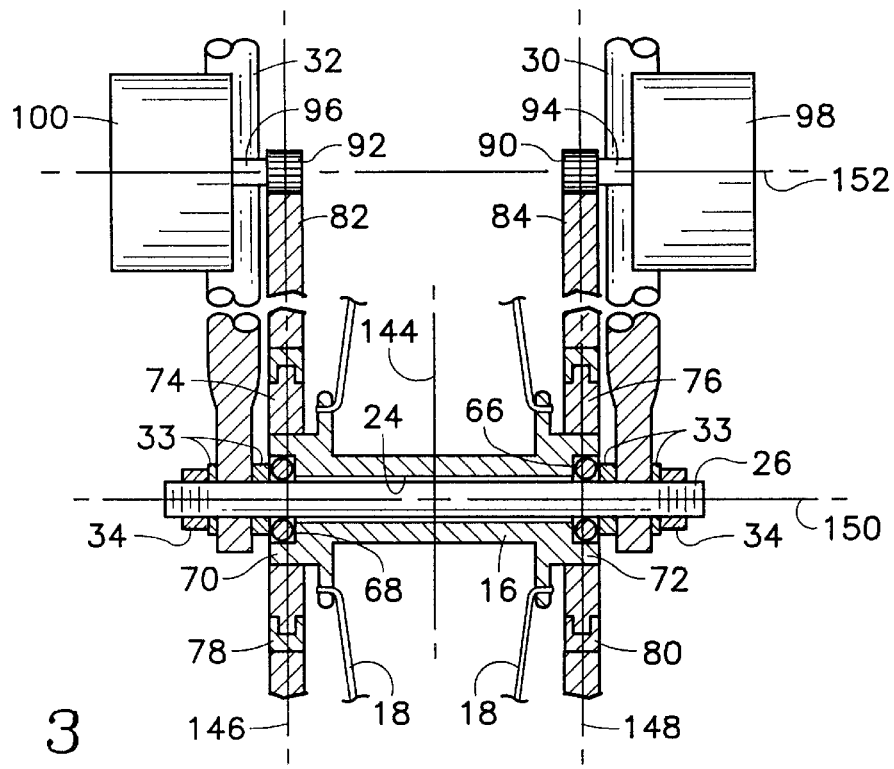
FIG. 3 is a cross-sectional view through the front wheel of the bicycle of FIG. 1, taken along line 3—3 of FIG. 1, showing clearly the direct drive arrangement with an external gear utilizing two separate drive motor assemblies.

One of the main advantages of the embodiment of FIG. 3 is that the front wheel 12 could be easily separated from bicycle 10 for maintenance (tire 22 repair, spoke 18 repair, etc.). The driven gears 82 and 84 readily separate from their respective drive gears 92 and 90. Reinstalling the front wheel 12 is also simple as it is only necessary to make certain the driven gears 82 and 84 mesh respectively with their drive gears 92 and 90 at which point nuts 34 can be tightened. This also applies to rear wheel 14 if the power assist apparatus is mounted thereon, as shown in FIG. 10.

Figure 4:
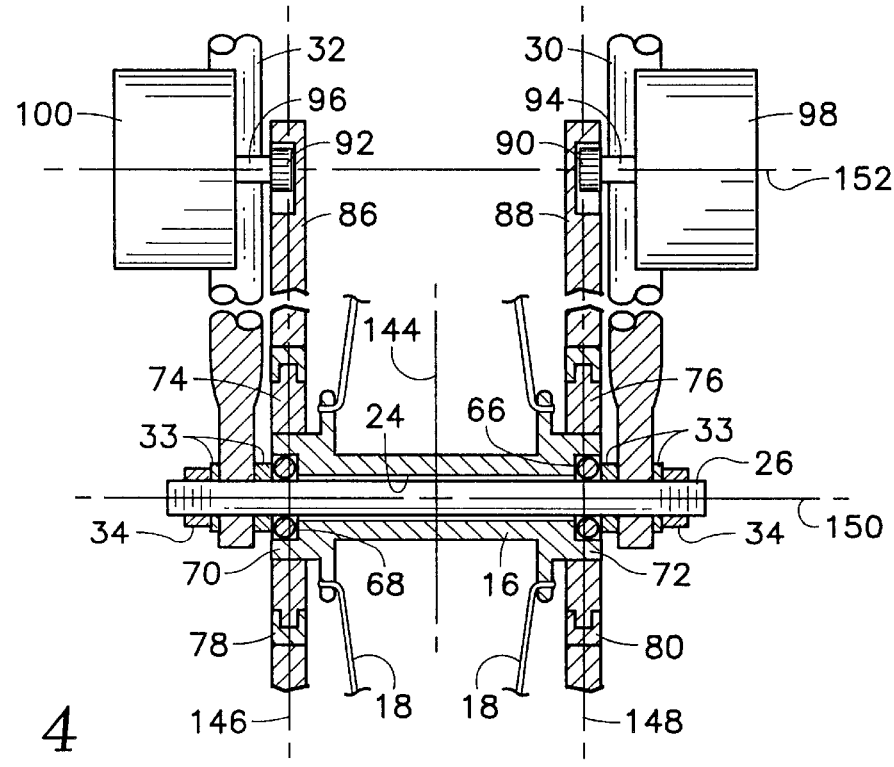
FIG. 4 is a view similar to FIG. 3 but where the driven gear comprises an internal gear rather than an external gear.
Figure 5:
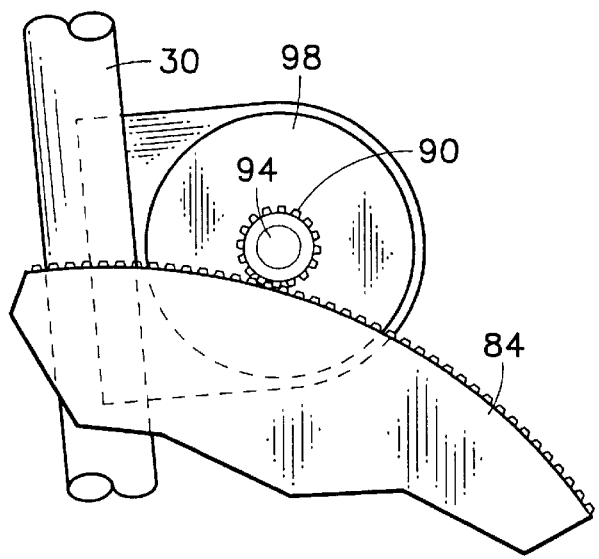
FIG. 5 is a view taken along line 5—5 of FIG. 2 clearly showing the direct drive relationship between the drive gear and the driven gear.

It is to be noted that when looking at FIG. 4, instead of external gear 82 there is an internal gear 86, and instead of external gear 84 there is an internal gear 88. Drivingly connected with the gears 84 or 88 is a drive gear 90. A similar drive gear 92 is operatively engaged with either external gear 82 or internal gear 86. The drive gear 90 is fixedly mounted onto a motor shaft 94 with drive gear 92 being fixedly mounted onto a motor shaft 96. The motor shaft 94 is to be rotatably driven by an electric motor 98 with the motor shaft 96 being similarly rotated by means of an electric motor 100. The motors 98 and 100 are located in a facing relationship, one on each side of the front wheel 12. The electric motors 98 and 100 will normally be of the same physical size and be of the same power. Any one of numerous different types of electric motors 98 and 100 could be utilized. The electrical operation of the motors 98 and 100 is to occur by an electrical connection with the electric control unit 64 which is to be operated by the human riding the bicycle 10. The motor 98 is fixedly mounted on the front fork member 30 with the motor 100 being fixedly mounted on the front fork member 32.

Normally the motors 98 and 100 will be operated simultaneously and in unison, but it is to be considered within the scope of this invention that only one motor 98 could be operated with the other motor 100 free wheeling. The power of motor 98 is transmitted through gear 90 to either gear 84 or 88 through the portion 72 of the axle sleeve 16 which will then function to rotate the front wheel 12. In a similar manner, the force of the motor 100 will be transmitted through the gear 92 to either gear 82 or gear 86 to the portion 70 to the axle sleeve 16 and similarly rotate the front wheel 12. It is considered to be within the scope of this invention that instead of having two separate motors 98 and 100, there may be only one motor utilized. If per chance the force that is transmitted is not in unison and one motor is running a little faster than the other, the motor that is slower will not create a drag since the clutch mechanism 78 or 80 will merely slip permitting the gear 82 or 84, 86 or 88 that is mounted in conjunction with the slower motor to also slip.

Figure 6:
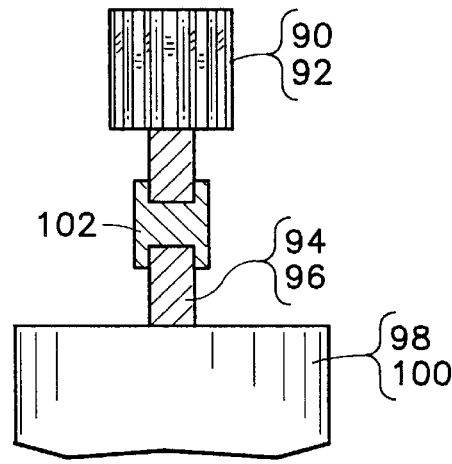
FIG. 6 is a view depicting the incorporating of a clutching mechanism between the drive gear and the motor assembly.

Instead of utilizing the clutches 78 and 80, there may be utilized a clutch 102 in conjunction with either motor 98 or 100. The clutch 102 is located between the motor shaft 94 and 96 and the drive gears 90 or 92. This clutch arrangement is shown in FIG. 6 of the drawings.

Figure 7:
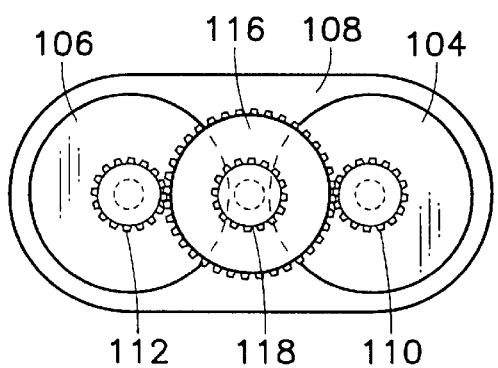
FIG. 7 is a view of one version of ganged-type motor assembly that could be used in conjunction with the subject matter of this invention.
Figure 8:
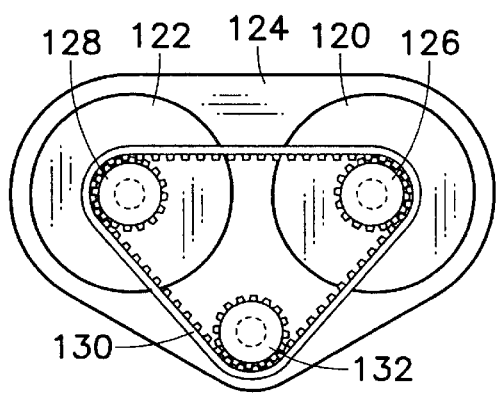
FIG. 8 is a view of a second version of a ganged motor assembly that could be used in conjunction with the subject matter of this invention.
Figure 9:
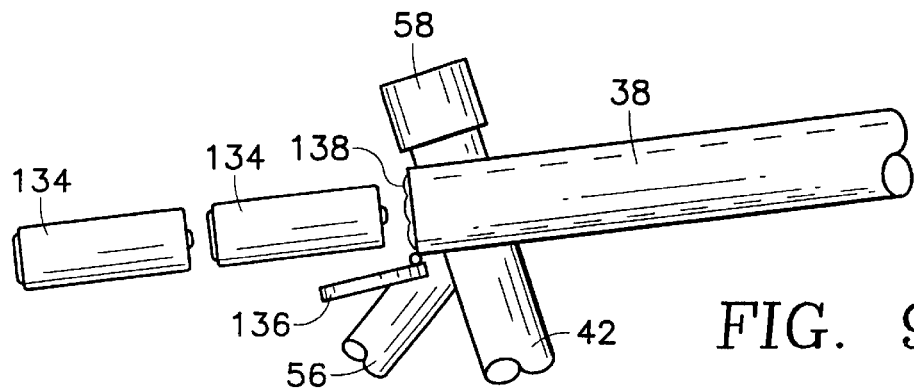
FIG. 9 is a view of a portion of the frame of the bicycle depicting the placement of the batteries within the frame with the batteries to be used to operate the motor assemblies in conjunction with the power assist apparatus of this invention.

Instead of using a single motor 98 or 100, there may be utilized a ganged series of motors for each motor assembly 98 and 100. Such a ganged series of motors is shown in FIGS. 7 and 8 of the drawings. In FIG. 7, substituting for either motor 98 or 100 would be a pair of motors 104 and 106 which is contained within a housing 108. Motor 104 rotates a drive gear 110. Motor 106 rotates a drive gear 112. The drive gears 110 and 112 cause rotation of an idler gear 116 which rotates a smaller gear 118. Smaller gear 118 will be operatively engaged with its respective driven gear 82, 84, 86 or 88. The advantage of using the ganged series shown in FIG. 7 is that more power can generally be supplied from using two different motors, and a gearing variation can be obtained by using different sizes of gears 116 and 118. For example, a four to one gear reduction can be obtained from gear 110 to gear 118 with an ultimate gear reduction of twenty to one.

Referring particularly to FIG. 8, each motor assembly 98 and 100 could comprise a pair of motors 120 and 122 which is mounted within a housing 124. Motor 120 rotates a drive gear 126 with motor 122 rotating a drive gear 128. The drive gears 126 and 128 are connected together by means of a belt 130. The belt 130 rotates a gear 132 and it is this gear 132 that is in contact with the driven gear 82, 84, 86 or 88.

The source of electrical power to the motors is to come from batteries 134. A convenient location for the batteries 134 can be within the hollow interior of the crossbar members 38 and 40 and also the hollow interior of the down tubes 50. A plurality (typically twenty to thirty) of batteries 134 is located within the crossbar members 38 and 40 and the down tubes 50. The open end of each crossbar member 38 and 40 can be closed by means of cover 136. There is to be a cover 136 for each crossbar member 38 and 40. Cover 136 is appropriately pivotally mounted on its respective crossbar member 38 and 40 by means of a hinge 138. Each down tube 50 also includes a similar cover 140 which is used to close off the hollow interior of the down tubes 50.

It is to be noted that the front wheel 12 rotates within a plane of rotation 144. Front wheel axle 26 rotates about an axis of rotation 150. The plane of rotation 144 is perpendicular to the axis of rotation 150. The output shaft 94 rotates on a rotational axis 152 with the output shaft 96 also rotating on the same rotational axis 152. The gear 86 is rotated within a rotational plane 146 with the gear 88 being rotatably driven within a rotational plane 148. The planes of rotation 146 and 148 are located parallel but spaced apart. It is to be noted that the axis of rotation 152 is located parallel to the axis of rotation 150. This is important as this parallel relationship provides for a smooth, relatively vibration-free transfer of power between the motors 98 and 100 to the front wheel 12. Further, the parallel relationship of 152 and 150 achieves simplicity in manufacture minimizing the number of separate parts, thereby reducing manufacturing costs. Also, the locating of the plane of rotations 144, 146 and 148 parallel to each other further adds to the smooth transfer of power.

Referring particularly to FIG. 10 of the drawings, there is shown a cross-sectional view through the rear wheel of the bicycle 10 which shows the pair of spaced apart seat stays 56 being fixedly mounted onto the axle 28 by means of nuts 154 with washers 156 being mounted on each side of each seat stay 56. The axle sleeve 158 includes a pair of bearings 160 and 162 which rotationally supports the axle sleeve 158 on the axle 28. The axle 28 is mounted within through bore 164 of the axle sleeve 158.

The axle sleeve 158 includes a right portion 166 on which is mounted the derailleur gears 62. Fixedly mounted on the axle 28 is a rear derailleur 168. The chain 60 connects to the rear derailleur 168 and the derailleur gears 162. Fixedly mounted on the axle sleeve 158 and extending outwardly therefrom are a plurality of spokes 170.

Fixedly mounted on the left portion 172 of the axle sleeve 158 is a disk 176. Mounted on the periphery of disk 176 is a one-way clutch mechanism 178. Mounted on the clutch mechanism 178 is an external gear 180. Operatively connecting with the external gear 180 is a drive gear 182. The drive gear 182 is fixedly mounted onto motor shaft 184 which extends from motor housing 186. Mounted within the motor housing 186 is a motor (not shown). The motor shaft 184 is rotated about an axis of rotation 188. The axis of rotation 188 is parallel to the axis of rotation 190 of the axle 28.

The structure of FIG. 10 is essentially similar to that of FIG. 3 with the exception there is only a single motor utilized rather than the dual motor arrangement of FIG. 3. The motor within the motor housing 186 is mounted on the left side of the rear wheel 14 with the derailleur gears 172 being mounted on the right side of the rear wheel 14. If it is necessary to move the rear wheel 14 to change a tire or to perform other maintenance, it is only necessary for the nuts 154 to be disengaged and the rear wheel 14 separated from seat stays 56-. The motor housing 186 is fixedly mounted on one of the seat stays 56 and will remain with the bicycle frame during separation of the rear wheel 14. The gears 180 and 182 will automatically disengage. After the performing of the necessary maintenance on the rear wheel 14, it is only necessary to reengage the rear wheel 14 in the normal manner at which time the gears 180 and 182 will be reengaged.

Referring particularly to FIG. 11, there is shown a modified version of this invention where there is a motor housing 192 which rotates a shaft 194 which in turn rotates a drive gear 196. The drive gear 196 and the shaft 194 are rotated about an axis of rotation 198. The gear 196 meshes with a driven gear 200 which operates the one-way clutch 202 which is mounted on disk 204. The disk 204 is mounted on the left portion 206 of an axle sleeve 208. The axle sleeve 208 includes a right portion 210. A bearing assembly 212 low frictionally mounts the left portion 206 on the axle 214. A bearing assembly 216 low frictionally mounts the right portion 210 on the axle 214. Spokes 218 connect in the normal manner to the axle sleeve 208. The axle 214 is hollow forming an internal opening 220. Located within the opening 220 is a control wire 222. The outer end of the control wire 222 is to be mounted on the handlebar 48 with the inner end of the control wire 222 to be connected to a gear 224 which is represented generally. The gear 224 is to be movable to the different positions relative to the different gears 226 which are mounted on axle 214. A gear reduction mechanism 228 is to be mounted within the axle sleeve 208 and is to operate in conjunction with the series of gears 226 and the gear 224.

Basically the gearing arrangement composed of gears 224 and 226 and gear reduction mechanism 228 accomplishes the same function as the derailleur 62. The advantage of FIG. 11 is that the derailleur 62 is not mounted on the exterior of the axle sleeve 158 but is included within the axle sleeve 208. Within FIG. 10 the energy supplied by the motor within motor housing 186 causes rotation of the rear wheel 14 with the gearing arrangement of the derailleur 62 being located separate from the motor and actually not having anything to do with the motor. However, within FIG. 11 this is not the case as the power assist force of the motor is transmitted to the axle sleeve 208 and then through the gearing arrangement to the wheel axle 214. In essence it can be said that in FIG. 11 the shifting gears are located in series with the force of the motor. Within FIG. 10 and in FIGS. 3 and 4 the force of the motors located within motor housing 98, 100 and 186 are transmitted in a parallel relationship with the derailleur 62 and has nothing to do with the shifting of the gears. This is a desirable feature within FIG. 11 as the power assisting force works in conjunction with the gearing arrangement and when the gearing arrangement is placed within lower gears, there is less of a tendency for the gear to "bind up" in transmitting of the force to the gears 196 and 200. When the bicycle 10 adjusts to various types of domain by changing of the gear ratio, the motor would also adjust to that different type of terrain.

It is to be understood that the bicycle 10 can be operated strictly by manual power by pedal assembly 52, or in combination with the manual force and the power assist from the motor assembly, or strictly by the motor assembly alone.

What is claimed is:

1. In combination with a bicycle, said bicycle having a frame mounted on at least one support wheel, said support wheel being rotatable within a plane of rotation, said support wheel having an axle with said axle being mounted on said frame, said axle having an axis of rotation which is perpendicular to said plane of rotation, the improvement comprising:

a disk mounted on said support wheel, said disk having a periphery, a one-way clutch mechanism mounted on said periphery, a driven gear mounted on said one-way clutch mechanism, said driven gear defining a rotational plane, said rotational plane being parallel to said plane of rotation, said disk having a center point, said center point coinciding with said axis of rotation; and a motor assembly having an output shaft, said motor assembly being mounted on said frame, said output shaft having a rotational axis, a drive gear mounted on said output shaft, said drive gear being in engagement with said driven gear, said rotational axis being parallel and spaced from said axis of rotation, said motor being electrically operated to rotate said drive gear and hence said driven gear which provides a power assist to rotate said support wheel.

2. The combination as defined in claim 1 wherein:

said driven gear comprising an external gear.

3. The combination as defined in claim 1 wherein:

said driven gear comprising an internal gear.

4. The combination as defined in claim 1 wherein:

said motor assembly comprising a plurality of separate motors connected together in parallel so the power outputs of said separate motors are combined.

5. The combination as defined in claim 1 wherein:

said motor assembly being driven by batteries, said batteries being mounted within said frame.

6. The combination as defined in claim 1 wherein:

said bicycle including a gearing mechanism, said gearing mechanism being mounted on said support wheel alongside said motor assembly.

7. The combination as defined in claim 6 wherein:

said gearing mechanism being located in a parallel relationship relative to said motor assembly.

* * * * *